(12) United States Patent
Lee et al.

(10) Patent No.: US 11,965,603 B2
(45) Date of Patent: *Apr. 23, 2024

(54) SYSTEMS AND METHODS FOR PROVIDING SURGE RELIEF

(71) Applicant: Celeros Flow Technology, LLC, Charlotte, NC (US)

(72) Inventors: Christopher Lee, Cypress, TX (US); Mark Lewandowski, Tomball, TX (US)

(73) Assignee: Celeros Flow Technology, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/082,775

(22) Filed: Dec. 16, 2022

(65) Prior Publication Data
US 2023/0184348 A1 Jun. 15, 2023

Related U.S. Application Data

(63) Continuation of application No. 17/498,162, filed on Oct. 11, 2021, now Pat. No. 11,555,551, which is a (Continued)

(51) Int. Cl.
*F16K 17/18* (2006.01)
*F16K 17/04* (2006.01)
(Continued)

(52) U.S. Cl.
CPC .............. *F16K 17/18* (2013.01); *F16K 17/04* (2013.01); *F17D 3/14* (2013.01); *F17D 5/00* (2013.01);
(Continued)

(58) Field of Classification Search
CPC .......... F16K 17/02; F16K 17/04; F16K 17/18; F16K 17/20; F16K 17/22; F16K 17/24;
(Continued)

(56) References Cited

U.S. PATENT DOCUMENTS

2,038,601 A * 4/1936 Quick ..................... F16K 1/126
137/220
2,095,243 A * 10/1937 Diescher ................... F17D 1/02
137/565.33
(Continued)

*Primary Examiner* — Daphne M Barry
*Assistant Examiner* — Frederick D Soski
(74) *Attorney, Agent, or Firm* — IceMiller LLP (57) ABSTRACT

The present disclosure pertains to a system configured to protect flows in piping systems using minimal spare components. Some embodiments may provide: a first piping subsystem configured to receive a portion of the input flow; a second piping subsystem configured to receive the portion of the input flow by substituting for the first subsystem; a test subsystem configured to detect whether each of the first and second subsystems is able to vent when at least one, in the each subsystem, of a respective pressure and a respective pressure rate satisfies first and second criteria, respectively; and first and second pilots configured to detect a maximum pressure and a maximum pressure rate, respectively, of the portion of the first and second subsystems.

14 Claims, 5 Drawing Sheets

Related U.S. Application Data continuation of application No. 16/580,582, filed on Sep. 24, 2019, now Pat. No. 11,143,322.

(60) Provisional application No. 62/845,502, filed on May 9, 2019, provisional application No. 62/843,807, filed on May 6, 2019.

(51) Int. Cl.
*F17D 3/14* (2006.01)
*F17D 5/00* (2006.01)

(52) U.S. Cl.
CPC ...... *Y10T 137/7758* (2015.04); *Y10T 137/776* (2015.04)

(58) Field of Classification Search
CPC .... F16K 17/26; F16K 17/36; Y10T 137/7758; Y10T 137/776; F17D 3/00–3/18; F17D 3/14; F17D 5/00
See application file for complete search history.

(56) References Cited

U.S. PATENT DOCUMENTS

| | | | | |
|---|---|---|---|---|
| 2,965,125 A * | 12/1960 | Osborne | ............... | F17D 3/08 15/104.062 |
| 4,119,391 A * | 10/1978 | Rutshtein | ............. | F04B 49/007 137/99 |
| 4,182,358 A * | 1/1980 | Sinelnikov | ............... | F17D 1/20 137/557 |
| 4,240,463 A * | 12/1980 | Moore | ............... | F16K 17/00 137/488 |
| 4,319,603 A * | 3/1982 | Snyder | ............... | F16K 17/105 137/492.5 |
| 4,372,334 A * | 2/1983 | Paul, Jr. | ............... | F16K 17/16 137/12 |
| 4,815,298 A * | 3/1989 | Van, Jr. | ............... | F17D 3/14 62/509 |
| 5,396,923 A * | 3/1995 | Allen | ............... | G05D 16/166 137/492.5 |
| 7,044,156 B2 * | 5/2006 | Webster | ............... | E21B 43/01 137/488 |
| 7,284,563 B2 * | 10/2007 | Partridge | ............... | F17D 1/20 137/488 |
| 8,051,875 B2 * | 11/2011 | Edwards | ............... | F17D 1/20 137/461 |
| 8,893,803 B1 * | 11/2014 | Lugo | ............... | E21B 43/013 166/347 |
| 9,169,939 B2 * | 10/2015 | Lybarger | ............... | G05B 15/02 |
| 9,416,904 B2 * | 8/2016 | Belady | ............... | F17D 1/20 |
| 9,618,944 B2 * | 4/2017 | Shan | ............... | G05D 16/2053 |
| 10,753,852 B2 * | 8/2020 | Mujica | ............... | G01N 17/04 |
| 2005/0161096 A1 * | 7/2005 | Sauer | ............... | B67C 3/001 137/599.14 |
| 2006/0243649 A1 * | 11/2006 | Deremiah | ............... | C02F 1/78 210/209 |
| 2011/0178736 A1 * | 7/2011 | Westra | ............... | F17D 5/02 702/50 |
| 2011/0308625 A1 * | 12/2011 | Stoisits | ............... | F17D 1/14 137/1 |
| 2016/0201838 A1 * | 7/2016 | Flanders | ............... | F16L 55/07 137/12 |
| 2017/0014874 A1 * | 1/2017 | Turner | ............... | E21B 21/06 |
| 2017/0067570 A1 * | 3/2017 | Said | ............... | F16K 27/00 |
| 2018/0045598 A1 * | 2/2018 | Barden | ............... | G01M 3/2823 |
| 2019/0284906 A1 * | 9/2019 | Wang | ............... | F17D 1/14 |
| 2022/0170730 A1 * | 6/2022 | He | ............... | F17D 5/00 |

* cited by examiner

SYSTEMS AND METHODS FOR PROVIDING SURGE RELIEF

CROSS-REFERENCE TO RELATED APPLICATIONS

This application is a continuation of U.S. patent application Ser. No. 17/498,162, filed Oct. 11, 2021, which is a continuation of U.S. patent application Ser. No. 16/580,582, filed Sep. 24, 2019, (now U.S. Pat. No. 11,143,322, issued Oct. 12, 2021), which claims the benefit of the priority dates of U.S. provisional application 62/843,807 filed on May 6, 2019 and of U.S. provisional application 62/845,502 filed on May 9, 2019, the contents of which are incorporated by reference herein in their entirety.

TECHNICAL FIELD

The present disclosure relates generally to systems and methods for preventing pipeline ruptures due to over-pressurization in at least a pair of piped runs by using an additional, spare run.

BACKGROUND

Guards against system damage associated with fluid processing, transfer, and storage, such as pressure surges (e.g., water hammer or other scenarios comprising pressurized fluids), are known. For example, rates of change that are too great or too little in an enclosed flow of a fluid may dangerously affect pressure. Surge of pressure can be generated by any system component. Known surge-relief systems implement valves to relieve, dissipate, or otherwise attenuate excessive pressure transients to a storage vessel, fluid of which being potentially returned to the product line. Known systems also may comprise costly spare subsystems that run parallel to each of the piping runs, thus inefficiently requiring much spare equipment.

SUMMARY

Systems and methods are disclosed for protecting piped flows via surge relief. More particularly, disclosed skids reduce complexity of piping subsystems by reducing an amount of spare parts and subsystems. Accordingly, one or more aspects of the present disclosure relate to a method for protecting a piping system with minimal redundancy. The method may be implemented by a first piping subsystem, at least a second piping subsystem, a test subsystem, a set of pilots, and/or other components.

Another aspect of the present disclosure relates to a system configured to perform this method. This system may comprise first and second piping subsystems respectively configured to receive a portion of the input flow. In some embodiments, each of the piping subsystems may comprise first and second pilots. The first and second pilots may be configured to detect a maximum pressure and a maximum pressure rate, respectively, of the respective portion. And the test subsystem may be configured to detect whether each of the first and second subsystems is able to vent when at least one, in the each subsystem, of a pressure and a pressure rate satisfies first and second criteria, respectively.

Yet another aspect of the present disclosure relates to a system comprising first, second, and third piping subsystems respectively configured to receive a first portion of the input flow, a second portion of the input flow, and either the first or second portion, the third piping subsystem accomplishing the latter by respectively substituting for either the first or second subsystem. In some embodiments, each of the piping subsystems may comprise first and second pilots. The first and second pilots may be configured to detect a maximum pressure and a maximum pressure rate, respectively, of the respective portion. And the test subsystem may be configured to detect whether each of the first, second, and third subsystems is able to vent when at least one, in the each subsystem, of a respective pressure and a respective pressure rate satisfies first and second criteria, respectively. Implementations of any of the described techniques may include a method or process, an apparatus, a device, a machine, or a system.

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure. These drawings may not be drawn to scale and may not precisely reflect structure or performance characteristics of any given embodiment.

DETAILED DESCRIPTION

As used throughout this application, the word "may" is used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Disclosed techniques improve at least upon the teachings of U.S. Pat. Nos. 5,396,923 and 7,284,563, which are incorporated herein by reference in their entireties. The improvements cause reduction in area/footprint, manufacturing costs, installation costs, and/or maintenance costs, and they relate to a spare pipeline having a dual-piloted, surge-relief valve, the spare serving as backup for a pair of parallel pipelines that each provide surge relief based on a rate of pressure rise and maximum pressure. This improvement is partly due to using a common header for reducing a number of spare runs.

Figure 2:
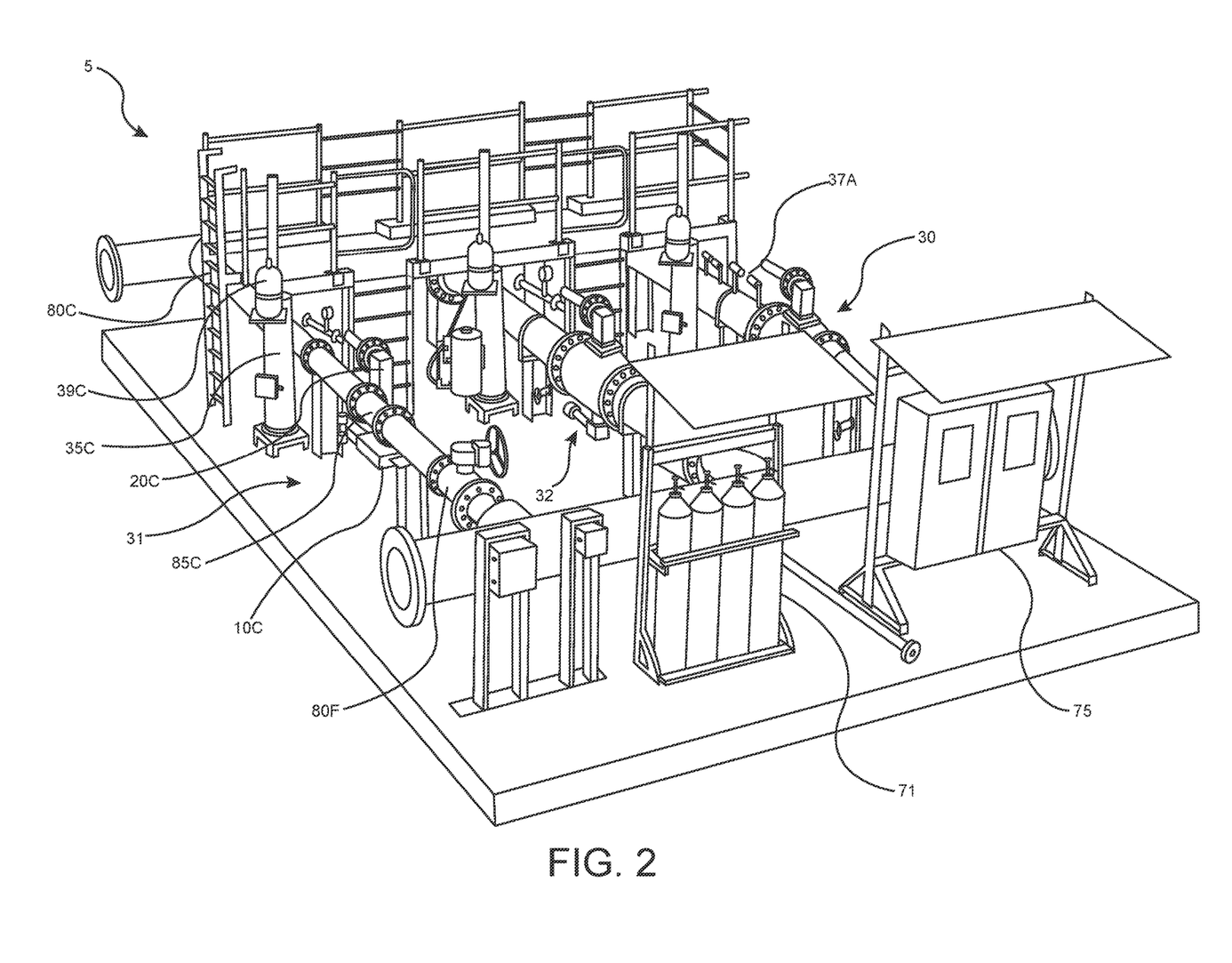
FIG. 2 depicts an isometric rendering of a piping and instrumentation diagram, in accordance with one or more embodiments.

As rendered exemplarily in the piping and instrumentation diagram (P&ID) of FIG. 2, a skid may perform rise and/or rate-of-rise protection. For example, a design may require different valve sizes and configurations according to the required flow capacity. Skid 5 may be a surge relief system that senses, tracks, and responds to pressure changes in the flow system that it is installed in. The purpose of its equipment may be to prevent damage to the flow system and/or damage by the flow system to a surrounding area. Some embodiments may limit a fluid velocity or delta change in pressure in the pipeline from exceeding a preset limit (e.g., having a time rate of rise of around 10 pounds per square inch (PSI) per second). Some embodiments may limit transient pressure changes in the pipeline by relieving valves before exceeding a preset limit (e.g., pressure levels of around 200 to 250 PSI). That is, system 5 may limit the maximum pressure and maximum pressure rates in the flow system.

Figure 1A:
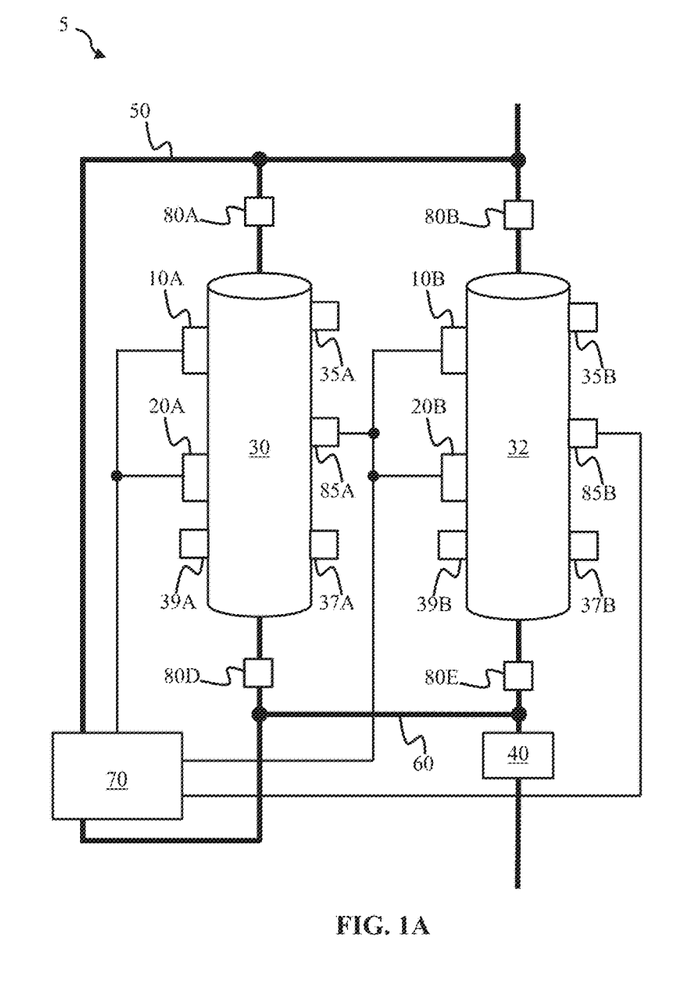
FIG. 1A illustrates an example of a testable surge-relief system comprising a regular subsystem and a spare subsystem, in accordance with one or more embodiments.

Disclosed in FIG. 1A is two independent, dual-pilot-operated surge-relief valves, which may be placed in parallel pipe runs that tie into common inlet and/or outlet headers mounted on a single skid base. As shown in FIG. 1A, the present disclosure contemplates having spare run 32 substitute for regular run 30. For example, at any one time, only one of protective subsystems 30 and 32 may be actively monitoring system pressures while the other of these subsystems may be offline and designated as a spare. The one subsystem may be used in the event that there is maintenance being performed on the other subsystem or if there is some type of equipment failure.

Figure 1B:
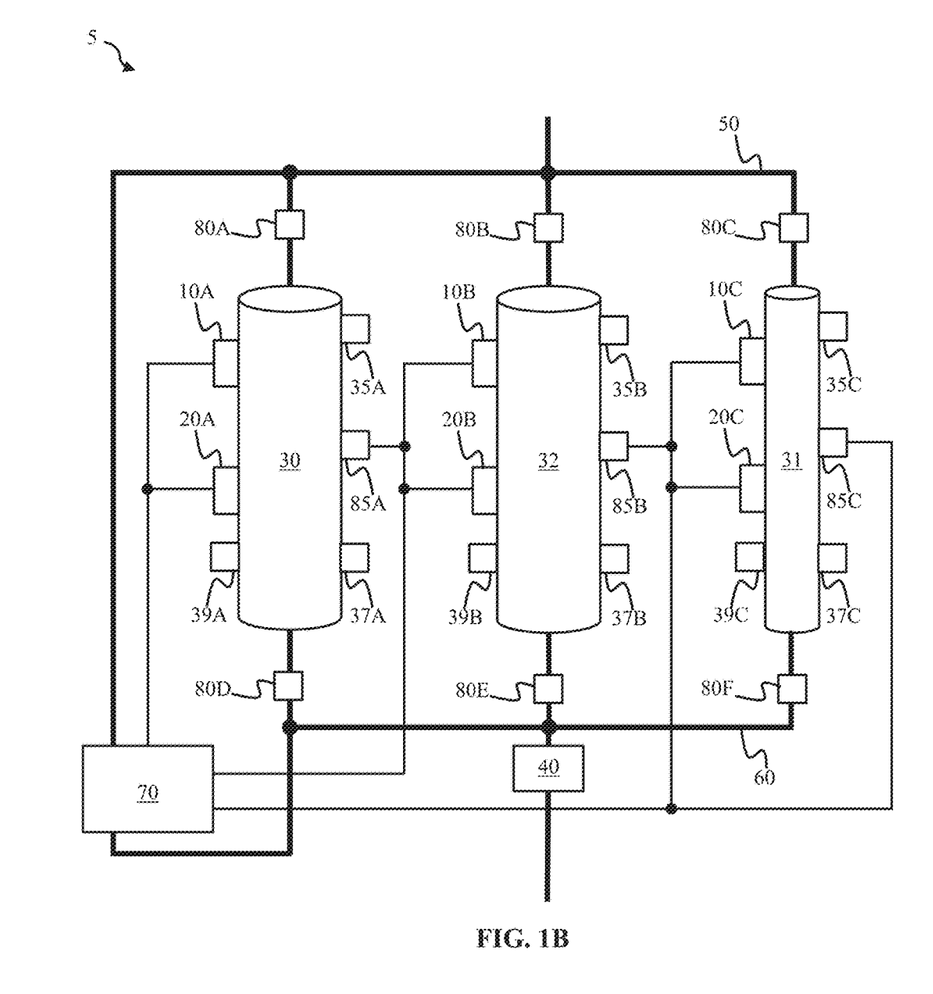
FIG. 1B illustrates an example of a testable surge-relief system comprising at least two regular subsystems and a spare subsystem, in accordance with one or more embodiments.

Disclosed in FIGS. 1B-2 are three independent, dual-pilot-operated surge-relief valves, which may be placed in parallel pipe runs that tie into common inlet and/or outlet headers mounted on a single skid base. As shown in FIGS. 1B-2, the present disclosure contemplates having spare run 32 substitute for any one of any number of regular runs (e.g., 30, 31, and/or one or more others). For example, at any one time, only two of protective subsystems 30-32 may be actively monitoring system pressures while a third, middle run may be offline and designated as a spare. The third subsystem may be used in the event that there is maintenance being performed on one of the active runs or if there is some type of equipment failure.

In relation to each pilot 10 and each pilot 20, some disclosed implementations may perform pressure-level detection (e.g., when a criterion is satisfied) and rate-of-rise detection (e.g., when another criterion is satisfied), respectively. Similarly, in relation to each valve 85, some disclosed implementations may perform pressure-level protection and/or rate-of-rise protection by venting fluid. Each surge relief valve 85 comprised in each of these subsystems may be isolated by block valves 80 located both upstream and downstream of each valve 85 to provide isolation for maintenance, as shown in FIGS. 1A, 1B, and 2. An active run may operate independently and sense (e.g., pressure of) a different piping subsystem.

System 5 may comprise pressure-sensing pilots (e.g., 10, 20), regulators, and control circuits that monitor pressure and determine if a pressure rise or surge event is occurring. Test circuit 70 may also be provided to simulate pressure rise and ensure that the system is functioning correctly. This test circuit may simulate high pressure rise and/or high pressure conditions and trigger the opening of surge relief valve 85 being tested. This test circuit may be off-line during normal operation and provided to allow the user to verify system operation. Nitrogen 71 may be used to actuate test circuit 70, but it is not required for normal operation.

During normal operation, if a high rate of pressure rise is sensed by system 5, the appropriate surge-relief valve may quickly open allowing the high pressure to be relieved with fluid exiting from the outlet header to be contained, e.g., as required. This may work to prevent high pressure gain or surge limiting the effects of the high pressure upstream of the surge relief valve. Once the pressure drops to acceptable levels, the surge relief valves may automatically close with normal operation returning to system 5.

Presently disclosed are embodiments of system 5 that may support against overpressure, common causes of overpressure in upstream operations being blockage of discharge, gas blowby, and fire. Some embodiments of system 5 may protect against water hammer, the fluid inlet at piping 50 being water. But these examples are not intended to be limiting, as disclosed embodiments may apply with other transient scenarios and with other fluids and gasses (e.g., a fuel), such as organic oil, mineral oil, a gas, or another fluid.

Each of FIGS. 1A-1B illustrates system 5 configured to substitute one or more particularly functioning piping subsystems with one other similarly functioning piping subsystem. System 5 may comprise a plurality of piping subsystems (e.g., 30, 31, 32, and/or one or more other piping subsystems) and a test subsystem configured to test at least one of the plurality of piping subsystems. For example, piping subsystems 30-32, upstream piping 50, and/or downstream piping 60 may each comprise one or more segments of a conduit, pipe, or another form of a channel.

In some embodiments, piping subsystem 32 may be a spare, e.g., for one or more of piping subsystem 30, piping subsystem 31, and one or more other piping subsystems. For example, when brining either subsystem 30 or 31 into maintenance, subsystem 32 may be piped into operation via valves 80. In this example, subsystem 30 or 31 (and subsystem 32) may be able to operate normally, when the other of subsystems 30 and 31 is isolated for the maintenance. System 5 may also support the opposite scenario, i.e., where subsystem 32 is brought into maintenance by using subsystems 30-31 normally.

In some implementations, piping subsystems 30-32 may be installed on one or more skids or pallets, each of which may comprise a steel frame and/or structural members of another suitable material. For example, the skids may come together and support various different components of system 5.

In some embodiments, piping subsystem 32 may have a same diameter as a widest piping subsystem, for which subsystem 32 is to substitute (e.g., piping subsystem 30 or another piping subsystem of system 5). For example, block valves 80B and 80E associated with piping subsystem 32 may be of a same size as block valves 80A and 80D associated with piping subsystem 30 or as block valves 80C and 80F associated with piping subsystem 31. In some embodiments, piping subsystem 32 is configured to cover any variation in set pressure or set pressure rate, e.g., between a run it is being requested to substitute and another run it previously substituted. In some embodiments, protection is provided by a surge-relief device configured to one or more fixed or predetermined set points. In other embodiments, one or more of the levels or points associated with protective measures may be adjustable in the field.

In some embodiments, one or more characteristics of piping subsystem 30 is different from one or more characteristics of piping subsystem 31; and the one or more characteristics of piping subsystem 30 may be the same as one or more characteristics of piping subsystem 32. In some embodiments, one or more characteristics of piping subsystem 32 is different from the one or more characteristics of piping subsystem 30. That is, any set or combination of features, characteristics, configuration, and/or topologies of components is contemplated by the present disclosure, provided that, from among such piping, there is an additional piping subsystem that can substitute for or otherwise replace existence of spare piping and components, e.g., with similar functionality but significantly less structural aspects or parts than if the substitution or replacement were otherwise attempted to provide a same level of piping performance or protection. In some embodiments, system 5 may comprise more than one additional piping subsystem (e.g., when there are more runs than the two regular runs 30 and 31) to perform substitutions or replacements.

Some embodiments may be comprised entirely of mechanical equipment (e.g., without electrical power and without Internet access), effectively securing against any electromagnetic or electrical influence by a hacker or cyber disruptor.

In some embodiments, pilots 10, pilots 20, and valves 85 may be interconnected or otherwise coupled, directly and/or indirectly, to piping subsystems 30-32. In some embodiments, piping subsystems 30-32 may interconnected or coupled, directly and/or indirectly, to piping 50 and 60. In some embodiments, a fluid may ingress upstream piping 50 at either or both sides of each of block valves 80A-80C. In some embodiments, a fluid may egress downstream piping 60 at either or both sides of each of block valves 80D-80F.

In some embodiments, any number of valves may be inserted at any location along inlet piping 50 and outlet piping 60, e.g., to facilitate or process a flow of fluid. Some embodiments of system 5 may comprise one or more additional components than depicted in FIGS. 1A, 1B, and 2. For example, there may be another block valve 80 that is in piping 50 between valves 80B and 80C. In this or another example, there may be a block valve 80 that is in piping 50 between valves 80A and 80B. In some embodiments, one or more of these additional block valves 80 may not be additional but rather they may replace a valve (e.g., block valve 80B, in embodiments where piping subsystem 32 is the spare run). These additional block valves 80 may be configured to a size that is of a same diameter of a maximum diameter between piping subsystems 30-32 or configured to a size that is of greater diameter.

In some embodiments, valves 80 (e.g., 80A, 80B, 80C, 80D, 80E, 80F, and/or one or more other valves) and valves 85 (e.g., 85A, 85B, 85C, and/or one or more other valves) may each be sized to a respective diameter of a pipe to which the each valve is coupled. These sizes may vary and depend on particular application demands. For example, these diameters may be between 2 and 16 inches and of a class between 150 #ASME and 900 #ASME. In this example or other examples, block valves 80A and 80D associated with piping subsystem 30 may be of a different size from block valves 80C and 80F associated with piping subsystem 31. Some embodiments of piping subsystems 30-32, piping 50, and/or piping 60 may support any flow capacity. In some embodiments, valves 80 are isolation valves.

The embodiments depicted in FIGS. 1A, 1B, and 2 are not intended to be limiting, as any suitable configuration of components may be used, including different types of valves (e.g., ball, hand, relief, surge relief, flow control, block, bleed, gate, etc.), accumulators (e.g., spring biased or biased via another means), pipes, flow elements, flow filters, headers, manifold blocks, pressure controllers, pressure indicators, pressure differential indicators, metering system, flow alarms, strainers, flow switches, orifice flanges, orifice plates, valve manifolds, pressure gauges, inlet termination points, outlet termination points, transfer barriers, reservoirs, and pilots.

In some embodiments, valve 85s may each perform a function (e.g., by coming in between pipe segments and processing a fluid therethrough). For example, this valve may be a (e.g., Danflo) surge-relief valve, a safety relief valve, or another valve of similar form factor. In some embodiments, valves 85 may respond to pressure surge events on the order of just a few milliseconds.

Pilots 10 and 20 of each piping subsystem may be instrumentation designed for detecting different types of pressure transients. For example, pilots 10A and 20A may be able to detect different maximum pressures and different maximum rates of pressure rise in piping subsystem 30 from pilots 10C and 20C of piping subsystem 31. 12. In one example, one of the different maximum rates of pressure rise may be 10 PSI per second. In some embodiments, each of piping subsystems 30-32 may comprise an additional pair of pilots 10 and 20, the other pair being installed at one or more different locations in the respective subsystem.

In some embodiments, each of pressure-sensing pilots 10 (e.g., 10A, 10B, 10C, and/or one or more other pilots) may be used to detect whether a current pressure breaches a maximum pressure level. For example, pilot 10 may sense pressure and relieve fluid based on user-defined values. In some embodiments, each of differential, pressure-sensing pilots 20 (e.g., 20A, 20B, 20C, and/or one or more other pilots) may be used to perform maximum-rate of pressure rise sensing. For example, pilot 20 may be a control valve driven through an accumulator with a spring, which has an orifice that meters the flows and senses pressure such that a rate of its rise may be controlled to a particular rate. In this or another implementation, pilot 20 may make a detection that causes valve 85 to open, when the rate breaches that threshold, until at least said rate is mitigated.

In some embodiments, each of pilots 10 and 20 of the respective subsystem is associated with a control valve. Some embodiments of piping subsystems 30-32 may comprise regulators configured to establish set pressures and define set pressures.

In some embodiments, some components of piping subsystems 30-32 may comprise accumulators 35 (e.g., 35A, 35B, 35C, and/or one or more other accumulators). These accumulators may be a spring-loaded accumulator or one or more other types of accumulators, such as no separator, gas-charged bladder, gas-charged piston, weight loaded, and/or diaphragm based.

In some embodiments, transfer barriers 39 (e.g., 39A, 39B, 39C, and/or one or more other transfer barriers) may comprise a movable piston sealed within a cylinder, or it may suitably comprise different structure.

In some embodiments, orifice plate 37 (e.g., 37A, 37B, 37C, and/or one or more other orifice plates) may comprise a device for measuring (e.g., volumetric or mass) flow rate, reducing pressure, restricting flow, or performing another suitable function.

In some embodiments, upon detection of a pressure transient or another condition relative to the fluid or piping equipment, piping 60 may be used to expunge or otherwise relieve a sufficient volume of fluid from system 5, thereby attenuating the transient to within acceptable limits.

Test subsystem 70 may be a circuit used to confirm that the piping subsystems 30-32 are working as expected and designed, e.g., by mimicking a change in pressure to make sure pilot sensing is working properly. In some embodiments, test subsystem 70 is connected to pilots 10 and 20.

In some embodiments, nitrogen is used (e.g., via additional piping) to actuate one or more components of the piping system, such as surge/pressure-relief valve 85 and test subsystem 70. For example, valve 85 may be pilot operated, dual-pilot operated, nitrogen loaded, spring-loaded, balanced spring-loaded, or actuated based on other suitable structure or material. Some embodiments of valves 80 and/or 85 may thus comprise (e.g., pressure-relief) valves of various types.

In some embodiments, test subsystem 70 comprises test panel assembly 75 and/or bottle rack assembly 71 that may comprise nitrogen. In some implementations, the containers of nitrogen may be positioned in close proximity to valve 85. The test panel may comprise a test-fluid(s) control panel that may dynamically control pressure(s) and/or adapt to changes in system 5. In some embodiments, test subsystem 70 comprises one or more redundant systems. In some implementations, test subsystem 70 may comprise an alarm generator that outputs a sound and/or light, which is audible and/or visible by an operator, e.g., when a predetermined condition (such as a particular pressure level or rate level in one or more of the piping subsystems) is met in system 5.

In some embodiments, test subsystem 70 is installed in a piping system (e.g., piping 50 and/or 60) at one or more locations upstream, downstream, parallel with, and/or distributed among first, second, and third subsystems 30-32 of system 5.

In some embodiments, piping element 40 may perform any suitable function according to demand (e.g., come in between and process a fluid passing upstream piping 50 or downstream piping 60). In some embodiments, water processor 40 (e.g., a membrane) is upstream, downstream, parallel to, and/or integrated with each of the piping subsystems 30-32. Processor 40 may be a filter of the fluid or remove an element, such as sulfur, to protect a membrane. Some embodiments may protect an oil pipe; alternatively, system 5 may protect water piping that has a filtering membrane (e.g., desalination implementation).

In some embodiments, skid system 5 may comprise one or more gauges, where appropriate for human read-out of measured or controlled values. Some embodiments of system 5 may comprise a walkway, gangway, or other elevated structure that hovers over various component of system 5, as depicted at the top of FIG. 2. System 5 may also comprise access ladders.

Figure 3A:
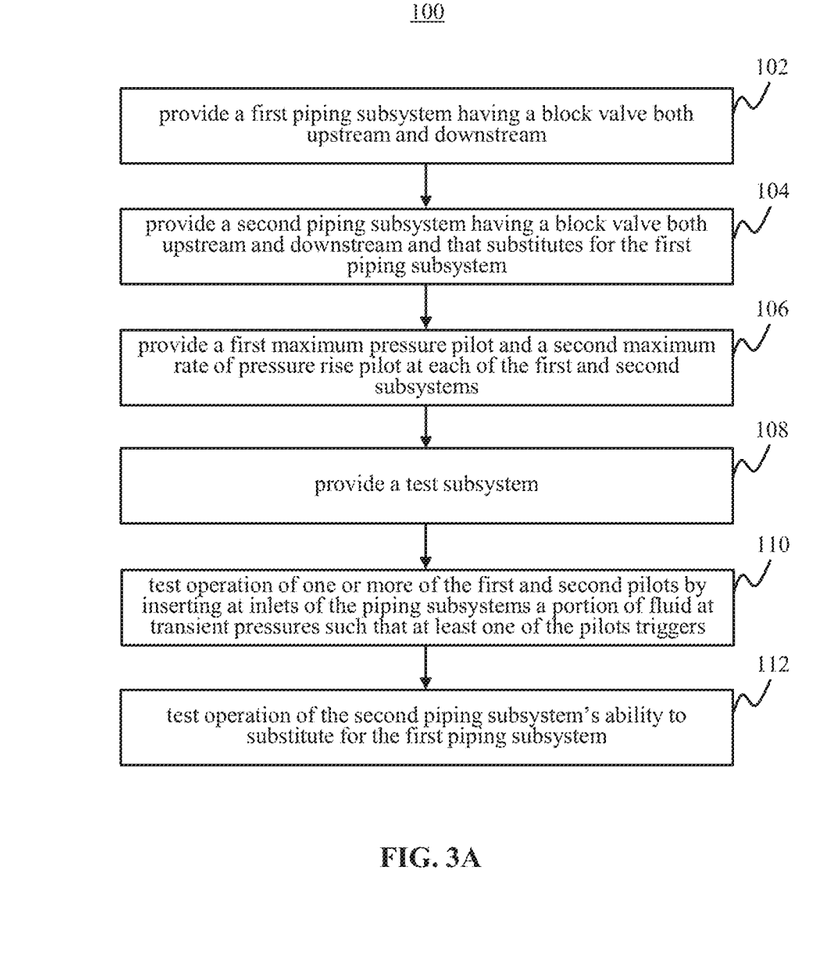
FIG. 3A illustrates a process for protecting a piping system comprising a regular subsystem and a spare subsystem and for testing the protective aspects of the piping system, in accordance with one or more embodiments.

FIG. 3A illustrates method 100 for configuring a piping system that can properly respond to transient pressure changes in an input flow of a fluid, in accordance with one or more embodiments. Method 100 may be performed with mechanical components. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 3A and described below is not intended to be limiting.

At operation 102 of method 100, a first piping subsystem may be provided, having a block valve both upstream and downstream of the subsystem. As an example, subsystem 30 and its connected components may be installed on a skid. In some embodiments, operation 102 is performed by a set of technicians that position and weld together at least some of the piping segments and components shown in FIG. 1A and described herein.

At operation 104 of method 100, a second piping subsystem may be provided that substitutes for the first piping subsystem, the second subsystem having one or more block valves both upstream and downstream of the second piping subsystem. As an example, subsystem 32 and its connected components may be installed on the skid. In some embodiments, operation 104 is performed by a set of technicians that position and weld together at least some of the piping segments and components shown in FIG. 1A and described herein.

At operation 106 of method 100, one or more pressure-sensing components (e.g., a first maximum pressure pilot and a second maximum rate of pressure rise pilot) may be provided at each of the first and second subsystems. As an example, pilots 10A and 20A may be installed in relation to valve 85A of piping subsystem 30, and pilots 10B and 20B may be installed in relation to valve 85B of piping subsystem 32. In some embodiments, operation 106 is performed by a set of technicians that position and attach the pressure-sensing components to the respective piping subsystem or valve, exemplarily shown in FIG. 1A and described herein.

At operation 108 of method 100, a test subsystem may be provided. As an example, test subsystem 70 may comprise a control panel and fluid for actuating a set of significant components (e.g., pilots) associated with piping subsystems 30 and 32. In some embodiments, operation 108 is performed by a set of technicians that attach the test subsystem to the piping subsystems (shown in FIG. 1A and described herein).

At operation 110 of method 100, operation of the one or more pressure-sensing components may be tested, e.g., by inserting at inlets of the piping subsystems a portion of fluid at transient pressures such that at least one of the pressure-sensing pilots triggers. As an example, test subsystem 70 may cause one or more scenarios (e.g., upstream pressure transients) to determine whether pilots 10 and/or 20 of each of any one or more runs configured via valves 80 into operation (e.g., 30 or 32) is able to properly detect particular type(s) of transient(s). In some embodiments, operation 110 is performed by components 10, 20, 50, 60, and/or 70, which are the same as or similar to those depicted in FIG. 1A and described herein.

At operation 112 of method 100, operation of the second piping subsystem may be tested, i.e., in its ability to substitute for the first piping subsystem. As an example, after block valves 80 are opened and closed respectively to facilitate piping subsystem 32 to receive an inlet fluid, the other piping subsystem 30 configured out of operation via these valves may not receive inlet fluid. Test subsystem 70 may cause one or more scenarios (e.g., pressure transients) to determine whether valve 85 of each of any one or more runs (e.g., 30 or 32) configured via valves 80 into operation is able to vent. In these examples, a surge event may be simulated by test subsystem 70 such that system 5 is able to properly respond to the test scenario by venting some of the transient fluid to a storage vessel or container. In one exemplary performance of the disclosed substitution, pilots 10B and 20B of subsystem 32 may be able to detect a same maximum pressure and/or a same maximum rate of pressure rise that is detectable in subsystem 30. In some embodiments, operation 112 is performed by components 10, 20, 50, 60, 70, and/or 85, which are the same as or similar to those depicted in FIG. 1A and described herein.

Figure 3B:
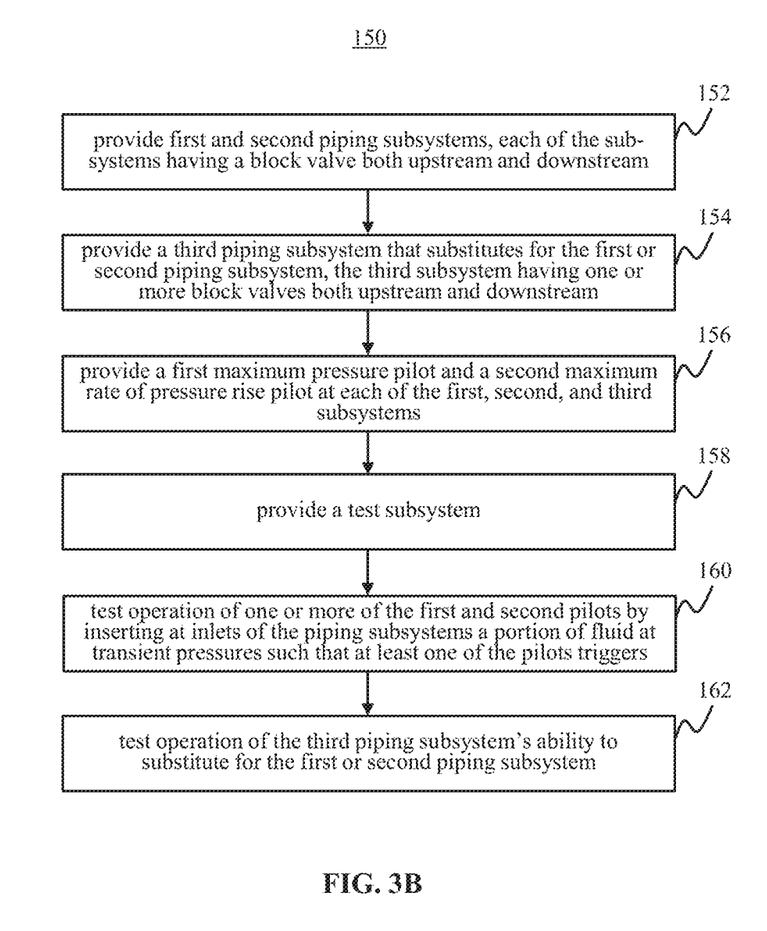
FIG. 3B illustrates a process for protecting a piping system comprising at least two regular subsystems and a spare subsystem and for testing the protective aspects of the piping system, in accordance with one or more embodiments.

FIG. 3B illustrates method 150 for configuring a piping system that can properly respond to transient pressure changes in an input flow of a fluid, in accordance with one or more embodiments. Method 150 may be performed with mechanical components. The operations of method 150 presented below are intended to be illustrative. In some embodiments, method 150 may be accomplished with one or more additional operations not described, and/or without one or more of the operations discussed. Additionally, the order in which the operations of method 150 are illustrated in FIG. 3B and described below is not intended to be limiting.

At operation 152 of method 150, first and second piping subsystems may be provided, each of the subsystems having a block valve both upstream and downstream of the respective subsystem. As an example, subsystems 30 and 31 (e.g., and one or more other subsystems not shown in FIGS. 1B-2) and their connected components may be installed on a skid. In some embodiments, operation 152 is performed by a set of technicians that position and weld together at least some of the piping segments and components shown in FIGS. 1B-2 and described herein.

At operation 154 of method 150, a third piping subsystem may be provided that substitutes for the first or second piping subsystem, the third subsystem having one or more block valves both upstream and downstream of the third piping subsystem. As an example, subsystem 32 and its connected components may be installed on the skid. In some embodiments, operation 154 is performed by a set of technicians that position and weld together at least some of the piping segments and components shown in FIGS. 1B-2 and described herein.

At operation 156 of method 150, one or more pressure-sensing components (e.g., a first maximum pressure pilot and a second maximum rate of pressure rise pilot) may be provided at each of the first, second, and third subsystems. As an example, pilots 10A and 20A may be installed in relation to valve 85A of piping subsystem 30, pilots 10B and 20B may be installed in relation to valve 85B of piping subsystem 32, and pilots 10C and 20C may be installed in relation to valve 85C of piping subsystem 31. In some embodiments, operation 156 is performed by a set of technicians that position and attach the pressure-sensing components to the respective piping subsystem or valve, exemplarily shown in FIGS. 1B-2 and described herein.

At operation 158 of method 150, a test subsystem may be provided. As an example, test subsystem 70 may comprise a control panel and fluid for actuating a set of significant components (e.g., pilots) associated with piping subsystems 30-32. In some embodiments, operation 158 is performed by a set of technicians that attach the test subsystem to the piping subsystems (shown in FIGS. 1B-2 and described herein).

At operation 160 of method 150, operation of the one or more pressure-sensing components may be tested, e.g., by inserting at inlets of the piping subsystems a portion of fluid at transient pressures such that at least one of the pressure-sensing pilots triggers. As an example, test subsystem 70 may cause one or more scenarios (e.g., upstream pressure transients) to determine whether pilots 10 and/or 20 of each of any two or more runs configured via valves 80 into operation (e.g., 30-31, 30 and 32, 31-32, or another combination of piping subsystems) is able to properly detect particular type(s) of transient(s). In some embodiments, operation 160 is performed by components 10, 20, 50, 60, and/or 70 (e.g., 71, 75, etc.), which are the same as or similar to those depicted in FIGS. 1B-2 and described herein.

At operation 162 of method 150, operation of the third piping subsystem may be tested, i.e., in its ability to substitute for the first or second piping subsystem. As an example, after block valves 80 are opened and closed respectively to facilitate piping subsystem 32 to receive an inlet fluid, the other piping subsystem configured into operation via these valves (e.g., 30, 31, or another run) may also receive inlet fluid. Test subsystem 70 may cause one or more scenarios (e.g., pressure transients) to determine whether valve 85 of each of any two or more runs (e.g., 30-31, 30 and 32, 31-32, or another combination of piping subsystems) configured via valves 80 into operation is able to vent. In these examples, a surge event may be simulated by test subsystem 70 such that system 5 is able to properly respond to the test scenario by venting some of the transient fluid to a storage vessel or container. In one exemplary performance of the disclosed substitution, pilots 10B and 20B of subsystem 32 may be able to detect a same maximum pressure and/or a same maximum rate of pressure rise that is detectable in either subsystem 30 or 31, respectively. In some embodiments, operation 162 is performed by components 10, 20, 50, 60, 70 (e.g., 71, 75, etc.), and/or 85, which are the same as or similar to those depicted in FIGS. 1B-2 and described herein.

Several embodiments of the invention are specifically illustrated and/or described herein. However, it will be appreciated that modifications and variations are contemplated and within the purview of the appended claims.

What is claimed is:

1. A system for responding to pressure changes in a fluid, the system comprising:
   a first piping subsystem that receives a first input flow;
   a second piping subsystem that receives a second input flow, the second piping subsystem being independent of the first piping subsystem;
   a third piping subsystem that receives the first input flow or the second input flow by respectively substituting for the first piping subsystem or second piping system; and
   a test subsystem that simulates surge events and detects whether each of the piping subsystems properly vent pressure in response to one or more of the simulated surge events;
   first and second pilots that detect a maximum pressure and a maximum pressure rate increase, respectively, in each of the piping subsystems; and
   for each piping subsystem, an associated set of operating valves,
   wherein each operating valve is sized in relation to a diameter of a respective pipe to which the valve is coupled,
   wherein the substituting is performed by actuating the operating valves
   wherein one or more operating valves associated with the first piping subsystem is of a different size from one or more operating valves associated with the second piping subsystem, and
   wherein one or more operating valves associated with the third piping subsystem has a diameter at least as wide as a widest diameter from among the operating valves associated with each of the first and second piping subsystems.

2. The system of claim 1, wherein one or more of the operating valves of each piping subsystem is a block valve that isolates for maintenance a selected piping subsystem from one or more unselected piping subsystems.

3. The system of claim 2, wherein the second subsystem, when the first piping subsystem is isolated for the maintenance, operates normally.

4. The system of claim 3, wherein at least a first block valve is located upstream the first and second pilots of a respective piping subsystem and at least a second block valve is located downstream the first and second pilots of the respective piping subsystem.

5. The system of claim 1, further comprising, for each piping subsystem, a surge-relief valve, wherein each piping subsystems vents pressure via one or more of the surge-relief valves.

6. The system of claim 5, wherein the test subsystem engages the surge-relief valve of each of the first, second, and third piping subsystems by stimulating the respective piping subsystem with a pressurized fluid.

7. The system of claim 1, wherein the first and second pilots detect different maximum pressures and different maximum pressure rate increases in each of the first and second piping subsystems.

8. The system of claim 7, wherein, when performing the substitution, the first and second pilots of the third piping subsystem detect a same maximum pressure and a same maximum pressure rate increase in either the first or second piping subsystem, respectively.

9. The system of claim 1, wherein each of the first, second, and third piping subsystems relieves a portion of the fluid into a container upon satisfaction of a criterion.

10. The system of claim 1, wherein each of the first, second, and third piping subsystems comprises a pair of pilots, the pairs of pilots being in addition to the first and second pilot.

11. The system of claim 1, wherein the first and second pilots are actuated mechanically without electrical power and without Internet access.

12. The system of claim 1, wherein the fluid is a liquid.

13. The system of claim 1, wherein the test subsystem uses nitrogen to increase pressure in each of the piping subsystems to simulate the surge events.

14. A method for responding to pressure changes in a fluid by a system, the method comprising:

providing a first piping subsystems that receives a first input flow;

providing a second piping subsystem that receives a second input flow, the second piping subsystem being independent of the first piping subsystem;

providing a third piping subsystem that receives the first input flow or the second input flow by respectively substituting for the first piping subsystem or the second piping system;

providing a test subsystem that simulates surge events and detects whether each of the piping subsystems properly vent pressure in response to one or more of the simulated surge events event;

providing, in each of the piping subsystems, first and second pilots that detect a maximum pressure and a maximum pressure rate increase, respectively; and providing, for each piping subsystem, an associated set of operating valves, wherein each operating valve is sized in relation to a diameter of a respective pipe to which the valve is coupled, wherein the substituting is performed by actuating the operating valves, wherein one or more operating valves associated with the first piping subsystem is of a different size from one or more operating valves associated with the second piping subsystem, and wherein one or more operating valves associated with the third piping subsystem has a diameter at least as wide as a widest diameter from among the one or more valves associated with each of the first and second piping subsystems.

* * * * *